(12) United States Patent
Wang et al.

(10) Patent No.: US 11,764,694 B2
(45) Date of Patent: Sep. 19, 2023

(54) CONFIGURABLE CONTROL LOOP ARRANGEMENT

(71) Applicant: NXP USA, Inc., Austin, TX (US)

(72) Inventors: Lingling Wang, Pudong New Area (CN); Kai-Wen Cheng, Taipei (CN); Chongli Wu, Queen Creek, AZ (US); Xiaoxiang Geng, Suzhou (CN); Xuwei Zhou, Shanghai (CN)

(73) Assignee: NXP USA, Inc., Austin, TX (US)

(*) Notice: Subject to any disclaimer, the term of this patent is extended or adjusted under 35 U.S.C. 154(b) by 83 days.

(21) Appl. No.: 17/546,896

(22) Filed: Dec. 9, 2021

(65) Prior Publication Data

US 2022/0209674 A1 Jun. 30, 2022

(30) Foreign Application Priority Data

Dec. 30, 2020 (CN) .......................... 202011643122.4

(51) Int. Cl.
*H02M 3/157* (2006.01)
*G05F 1/575* (2006.01)
(Continued)

(52) U.S. Cl.
CPC ..... *H02M 3/33576* (2013.01); *H02M 1/0012* (2021.05); *H02M 3/33571* (2021.05);
(Continued)

(58) Field of Classification Search
CPC ..... G05F 1/575; H02M 1/0012; H02M 3/157; H02M 3/33515
See application file for complete search history.

(56) References Cited

U.S. PATENT DOCUMENTS 5,969,515 A * 10/1999 Oglesbee .............. H02M 3/157
323/283
7,428,159 B2 * 9/2008 Leung ................ H02M 3/33569
323/284
(Continued)

FOREIGN PATENT DOCUMENTS

EP 2339734 A1 6/2011

OTHER PUBLICATIONS

Fairchild Semiconductor Corporation: "FAN7688: Advanced Secondary Side LLC Resonant Converter Controller with Synchronous Rectifier Control," Nov. 2015, www.onsemi.com, pp. 1-32.
(Continued)

*Primary Examiner* — Gary A Nash

(57) ABSTRACT

A configurable control loop arrangement for forming a control loop of a DC-DC converter that is configured to generate a control signal to control the DC-DC converter, the configurable control loop arrangement comprising: a digital-to-analog converter; a comparator; a timer configured to provide a timing-signal for controlling one or more of: the comparator in the determination of the comparison signal; the application of the comparison signal to a configurable-event-generation-logic-module; and the operation of the configurable-event-generation-logic-module; wherein the configurable-event-generation-logic-module comprises a flip-flop circuit, and wherein the configurable-event-generation-logic-module, when implemented in the control loop, is configured to provide for generation of the control signal based on the comparison signal, the timing-signal and a selected mode of the flip-flop circuit, and wherein the control signal is for application to one or more switches of the DC-DC converter.

15 Claims, 8 Drawing Sheets

(51) Int. Cl.
*H02M 3/335* (2006.01)
*H02M 1/00* (2006.01)
(52) U.S. Cl.
CPC ......... *H02M 3/33573* (2021.05); *G05F 1/575* (2013.01); *H02M 1/0009* (2021.05); *H02M 3/157* (2013.01)

(56) References Cited

U.S. PATENT DOCUMENTS

| | | | | |
|---|---|---|---|---|
| 7,772,904 | B1* | 8/2010 | Cooke | H02M 3/157 327/175 |
| 2005/0111242 | A1* | 5/2005 | Oh | H02M 3/33507 363/21.07 |
| 2011/0089928 | A1* | 4/2011 | O'Gorman | H02M 3/33515 323/318 |
| 2012/0119719 | A1* | 5/2012 | Teh | H02M 3/1588 323/282 |
| 2014/0117959 | A1* | 5/2014 | Costa | H02M 3/157 327/134 |

OTHER PUBLICATIONS

Hu, et al.: "Bang-Bang Charge Control for LLC Resonant Converters," IEEE Transactions on Power Electronics, vol. 30, No. 2, Feb. 2015, pp. 1093-1108.

Kang, et al.: "Digitally Implemented Charge Control for LLC Resonant Converters," IEEE Transactions on Industrial Electronics, vol. 64, No. 8, Aug. 2017, pp. 6159-6168.

Texas Instruments: "UCC256301 Hybrid Hysteretic Mode Wide VIN LLC Resonant Controller Enabling Ultra-Low Standby Power," UCC256301, SLUSCU6B—Aug. 2017—Revised Aug. 2017, www.ti.com, pp. 1-73.

* cited by examiner

Figure 3
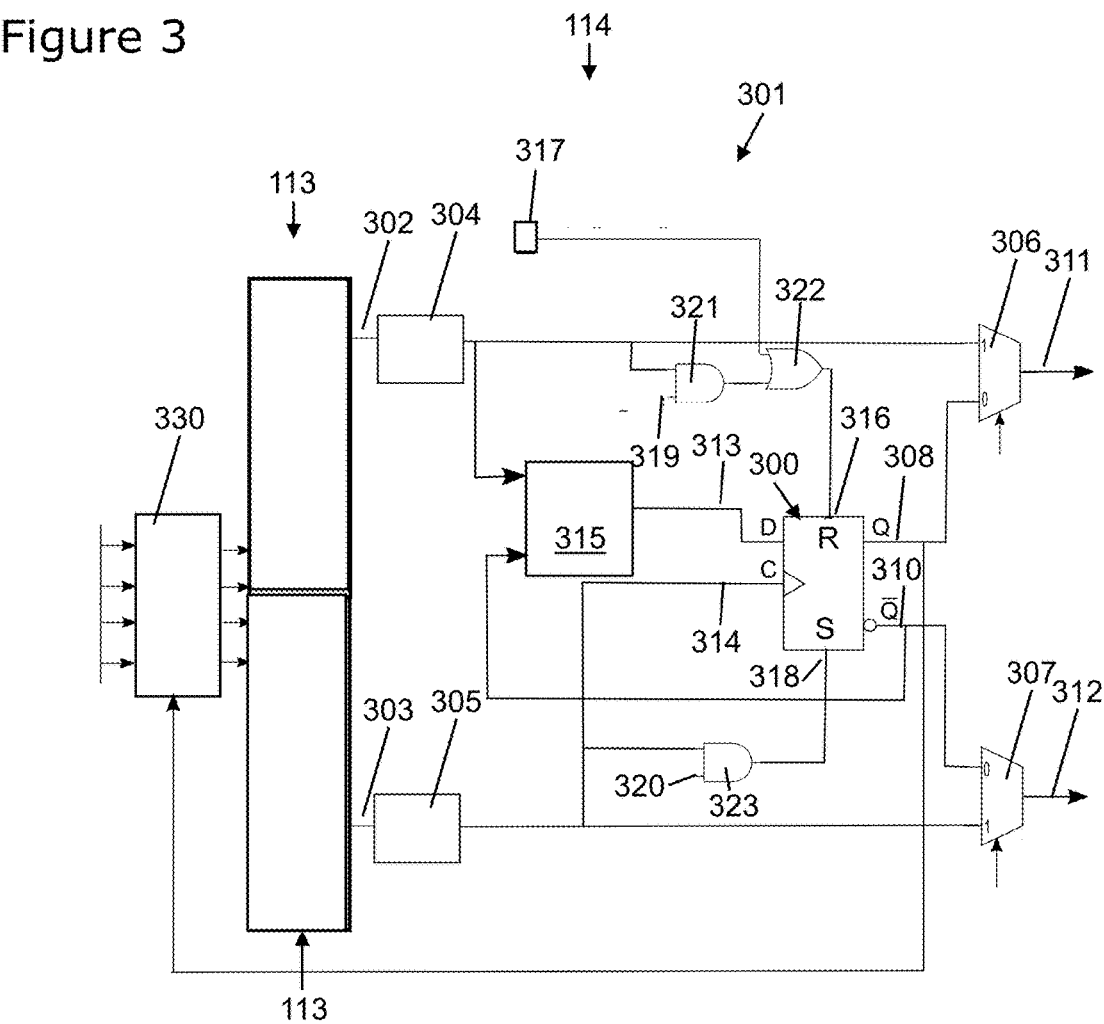
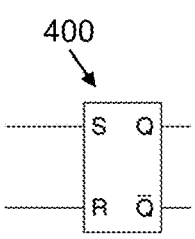
Figure 4A
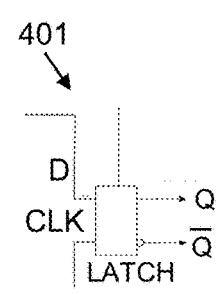
Figure 4B
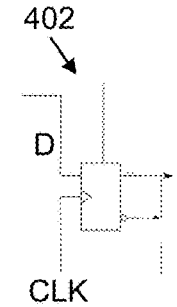
Figure 4C
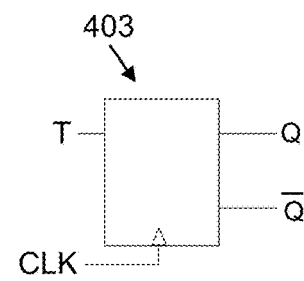
Figure 4D

CONFIGURABLE CONTROL LOOP ARRANGEMENT

CROSS-REFERENCE TO RELATED APPLICATIONS

This application claims the priority under 35 U.S.C. § 119 of China application no. 202011643122.4, filed on 30 Dec. 2020, the contents of which are incorporated by reference herein.

FIELD

The present disclosure relates to a configurable control loop arrangement. In particular, the configurable control loop arrangement may be configurable in different ways to provide a control loop for different DC-DC convertors.

BACKGROUND

The implementation of control loops of DC-DC converters has been substantially analog for many years. Analog control loops may be complex, bulky and inflexible. It may be advantageous for any new control methods and applications, such as for a server power supply and for a class-D type wireless charger, for digital solutions to be developed. However, this can cause significant delays in bringing a product to market.

SUMMARY

According to a first aspect of the present disclosure there is provided a configurable control loop arrangement for forming a control loop of a DC-DC converter that is configured to generate a control signal to control the DC-DC converter, the configurable control loop arrangement comprising:

a digital-to-analog converter configured to receive a first-digital-parameter indicative of a difference between an output voltage from a secondary side of the DC-DC converter and a reference voltage, and output an analog converter-output-control-signal based thereon;

a comparator configured to receive the analog converter-output-control-signal at a first terminal and a monitored parameter at a second terminal, the comparator configured to output a comparison signal based on the difference between the converter-output-control-signal and the monitored parameter, wherein the second terminal is configured to be coupled to a primary side of the DC-DC converter to receive the monitored parameter, which is indicative of one of a voltage or current flowing at a component of a primary side of the DC-DC converter;

a timer configured to provide a timing-signal for controlling one or more of: the comparator in the determination of the comparison signal; the application of the comparison signal to a configurable-event-generation-logic-module; and the operation of the configurable-event-generation-logic-module;

wherein the configurable-event-generation-logic-module comprises a flip-flop circuit including a flip-flop cell and mode control circuitry configured to enable the flip-flop cell to operate in a selected mode comprising one of a plurality of modes, said selected mode selected based on a configure-signal received at a terminal of the mode control circuitry, wherein the configurable-event-generation-logic-module, when implemented in the control loop, is configured to provide for generation of the control signal based on the comparison signal, the timing-signal and the selected mode of the flip-flop circuit, and wherein the control signal is for application to one or more switches of the DC-DC converter.

Thus, the DAC may be configured to receive the first-digital-parameter from a software-based module that forms part of the control loop alongside the configurable control loop arrangement.

In one or more embodiments, the second terminal is configure to receive, as the monitored parameter, one of:
a measure of current in a primary transformer winding of the DC-DC converter; and
a first capacitor voltage, wherein the primary side of said DC-DC converter includes an LLC arrangement, wherein the LLC arrangement comprises a first inductor and the first capacitor in series with a parallel arrangement of a second inductor and a primary transformer winding of the DC-DC converter.

In one or more embodiments, the configurable-event-generation-logic-module includes an AND-OR-INVERT module comprising an arrangement of configurable logic gates which can adopt either of at least a first configuration and a second configuration based on an AND-OR-INVERT-control-signal, wherein the AND-OR-INVERT module is configured to receive at least the comparison signal and the timing-signal and provide, as an output based on which of the at least first and second configuration is currently adopted, a corresponding first set of values or a different, corresponding second set of values, the first set of values and the second set of values comprising different sets of values which include one or more of the comparison signal, the timing- signal, the comparison signal having a logical operation applied thereto, and the timing-signal having a logical operation applied thereto, and wherein said output is provided to the flip-flop circuit.

In one or more examples, the arrangement includes a PWM generator configured generate a PWM signal for controlling switches of the DC-DC converter based on the control signal, and wherein the AND-OR-INVERT module is also configured to receive said PWM signal and output, depending on the first configuration or second configuration, the PWM signal or the PWM signal having a logical operation applied thereto.

In one or more examples, the AND-OR-INVERT module comprises a logic high terminal configured to receive a persistent logic high signal and a logic low terminal configured to receive a persistent logic low signal and wherein the
AND-OR-INVERT module is configurable to provide said logical operations further based on said logic high and logic low signals in one or both of the first configuration and the second configuration.

In one or more embodiments, the logical operations include one or more of logic AND, logic NOT and logic OR or combinations thereof applied to at least the comparison signal and the timing-signal.

In one or more embodiments, said mode control circuitry is configured to control signals applied to the flip flop cell and thereby configure the flip-flop cell to operate in said plurality of modes, said plurality of modes comprising modes that comprise the flip-flop cell operating as at least two of:
a set-reset flip flop;
a delay flip flop;
a D latch flip-flop;
a T flip flop; and
a JK flip flop.

In one or more embodiments, the flip flop cell comprises a delay type flip flop having a D-input, a C-input, a Q-output and a Q-complement-output, and the mode control circuitry is configured to provide, in one of the plurality of modes, the Q-complement-output to the D-input and, in a different one of the plurality of modes, provide an input to the flip-flop circuit to the flip-flop cell, said input based on one of the timing-signal or the comparison signal.

In one or more embodiments, the configurable-event-generation-logic-module comprises a counter, the counter configured to receive a clock signal and the control signal from the configurable-event-generation-logic-module, the counter configurable to measure a time period representing the duration of a state of the control signal and upon elapse of said measured time period from a time point when said state of the control signal changes, provide an input to the flip-flop circuit to provide for control of the control signal.

In one or more embodiments, the configurable control loop arrangement includes one or more of a:
  GPIO input configured to receive signalling indicative of a request for synchronization of the control loop, during operation, with an external event or for safety shutdown;
  ADC input configured to receive signalling indicative of a request for an over temperature limit shutdown;
  PWM input configured to receive a PWM signal, the PWM signal comprising pulse width modulated version of the control signal.

In one or more embodiments, the configurable control loop arrangement includes at least a first multiplexer arrangement having a plurality of input terminals and a plurality of output terminals and comprising a plurality of multiplexers, wherein each multiplexer is associated with a respective one of the plurality of output terminals;
  wherein said plurality of multiplexers are each configured to receive a plurality of signals received at the plurality of input terminals, said plurality of multiplexers each individually configurable to direct one of the plurality of signals received thereby to its associated output terminal based on a multiplex- selection-signal;
  wherein said plurality of signals received at the plurality of input terminals includes said comparison signal and said plurality of output terminals are coupled to said AND-OR-INVERT module.

In one or more examples, the arrangement includes a PWM generator configured generate a PWM signal for controlling switches of the DC-DC converter based on the control signal, and wherein the first multiplexer is also configured to receive said PWM signal and output the PWM signal to one or both of the AND-OR-INVERT module and the flip-flop circuit.

In one or more embodiments, said plurality of signals received at the plurality of input terminals of the first multiplexer arrangement includes an output of a PWM generator configured to generate a PWM signal based on the control signal.

In one or more embodiments, said plurality of input signals to the first multiplexer includes said timing-signal and at least one of the plurality of output terminals are coupled to the comparator to enable control of the determination of the comparison signal.

In one or more embodiments, the configurable control loop arrangement includes at least a second multiplexer arrangement having a plurality of input terminals and a plurality of output terminals and comprising a plurality of multiplexers, wherein each multiplexer is associated with a respective one of the plurality of output terminals;
  wherein said plurality of multiplexers are each configured to receive a plurality of signals received at the plurality of input terminals, said plurality of multiplexers each individually configurable to direct one of the plurality of signals received thereby to the associated output terminal based on a second multiplex-selection-signal;
  wherein said plurality of signals received at the plurality of input terminals comprise an output of said flip-flop circuit.

In one or more embodiments, said plurality of output terminals of the second multiplexer are coupled to a second AND-OR-INVERT module configured for applying logical operations to input signals applied thereto and a pulse width modulation, PWM, generator configured to generate one or more PWM signals based on the signals from the output terminals of the second multiplexer.

In one or more embodiments, said configurable control loop arrangement includes a pulse width modulation, PWM, generator configured to generate one or more PWM signals based at least on the control signal generated by the flip-flop circuit, said PWM signals comprising a switching pattern for switches of the DC-DC converter.

In one or more embodiments, said configurable control loop arrangement is configurable as a control loop for at least one of a Phase Shift Full Bridge, PSFB, DC-DC convertor and a Half bridge LLC DC-DC converter.

According to a further aspect of the disclosure, there is provided a device powered by a DC-DC convertor having the configurable control loop arrangement of the first aspect configured to provide a control loop for said DC-DC converter. In one or more examples, the device comprises a wireless charger or a power supply for a computing device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 3 shows an example embodiment of a flip-flop circuit and mode control circuitry;

FIGS. 4A-4D show example representations of the flip-flop circuit in different selected modes based on mode control circuitry;

DETAILED DESCRIPTION

Figure 1:
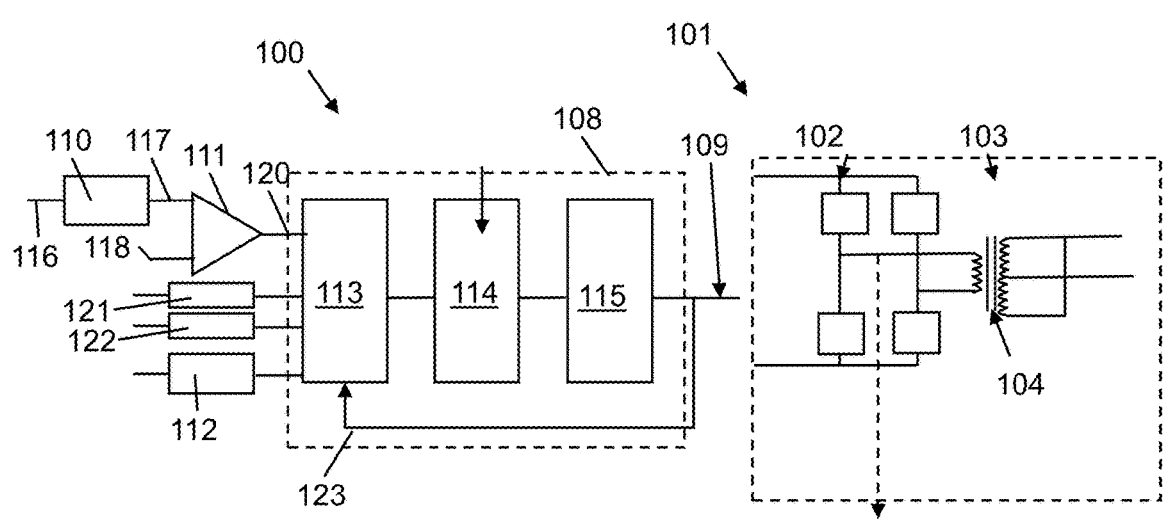
FIG. 1 shows an example embodiment of a configurable control loop arrangement of a DC-DC converter.

The examples of this disclosure present a configurable control loop arrangement for use in implementing a control loop of a DC-DC converter. Thus, the hardware components described in the embodiments that follow are configurable so that a control loop can be formed to control a DC-DC converter. For example, the configurable control loop arrangement described herein may receive signalling to cause it to configure itself for use as a control loop for a Phase Shift Full Bridge DC-DC converter. Alternatively, different signalling may cause it to configure itself for use as a control loop for a Half bridge LLC converter DC-DC converter. It will be appreciated that a control loop for a DC-DC converter is required to receive signals that represent the operating state of the DC-DC converter and provide a control signal (which may comprise one or more component signals) to control the operation of switches of the DC-DC converter. For example, the control signal may be used to control one or more switches of a primary side of the DC-DC converter, such as the switches that control the application of power to primary windings of the DC-DC converter.

The control of a particular DC-DC converter type may require different measured signals or different combinations of signals received at different terminals of the hardware components that form the configurable control loop arrangement. Accordingly, the configurable control loop arrangement may include components to modify and route input signals to a flip-flop circuit, wherein the flip-flop circuit is configured to generate the control signal.

One or more of the hardware components are configured by software to adopt a configuration for implementation of the desired control loop and or to control operation of the configurable control loop arrangement once configured for use with a particular DC-DC converter.

The configurable control loop arrangement includes a configurable-event-generation-logic-module (or CEVTG module, for brevity) which includes a flip-flop circuit and mode control circuitry, in hardware, to provide for effective control of the DC-DC converter. The configurable control loop arrangement also includes an analog comparator and a Digital-to-Analog Converter (DAC) and a programmable timer, as will be presented in the examples that follow, which provide inputs to said CEVTG module for determination of a control signal for control of the DC-DC converter. This arrangement of configurable control loop arrangement hardware has been found to provide for a particularly effective implementations of different desired control loops. Further, control loops implemented using the configurable control loop arrangement may overcome processing limitations that may be experienced when implementing an equivalent control loop in software or as an Application-specific Integrated Circuit.

In general terms, the CEVTG module comprises a flip-flop circuit that may receive signalling for determination of a control signal from an optional multiplexer arrangement that is configured to provide for routing of signals received by the CEVTG module. The CEVTG module may further includes an AND-OR-INVERT (AOI) Boolean logic module for applying logical operations to the input signals and/or forming logical combinations of the input signals. The AOI module is thus able to create the signals required by the flip-flop circuit to generate the control signal appropriate for whatever control loop is being implemented. The flip-flop circuit comprises a flip-flop cell and mode control circuitry to cause the flip-flop cell to operate as different types of flip-flops. The mode control circuitry may be configured by a software derived configure signal, which configures the flip-flop circuit to operate as a J-K flip-flop, D flip-flop, R-S latch flip-flop, T-Flip Flop. The software derived configure signal may also configure the AND-OR-INVERT (AOI) Boolean logic module and/or first multiplexer arrangement.

The configurable control loop arrangement may use configurable hardware blocks (which are configurable by a configure signal, which may be derived from a software based process) to construct a control loop, which can operate with reduced software involvement. The control loop formed by the configurable control loop arrangement, in one or more examples, supports various operation modes, such as soft-start and burst mode in DC-DC converter power conversion applications.

Referring now to the figures, FIG. 1 shows a control loop 100 or a DC-DC converter 101. The DC-DC converter 101 is shown schematically simply to illustrate a general structure. The DC-DC converter 101 may comprise a switched mode power supply, such as a Phase Shift Full Bridge converter or a Half bridge LLC converter. As will be known to those skilled in the art, such converters typically comprise a primary side 102 for receiving and switching an input voltage and a secondary side 103, providing the output voltage of the converter, optionally separated by a transformer 104. The primary side typically has one or more switches for switching the input voltage for controlling the charging of one or more components of the primary side 102. The configurable control loop arrangement 100 disclosed herein may provide an advantageous arrangement of components/modules for generation of the control signal and is, to some degree, independent of the converter type.

The configurable control loop arrangement 100 is configured to generate the control signal at output 109 to control the DC-DC converter 101. The control signal may provide for the controlling of the one or more switches of the DC-DC converter. For example, the control signal may provide said control of the switches in terms of the timing of them being switched between non-conducting and conducting states. It will be appreciated that there may be other ways known to those skilled in the art to control the DC-DC converter.

The configurable control loop arrangement 100 comprises a plurality of components that enable a control loop to be formed.

The configurable control loop arrangement 100 comprises a digital-to-analog converter 110 for receiving a first parameter indicative of the operation of the DC-DC converter on which the control provided by the configurable control loop arrangement 100, when configured, is based. The configurable control loop arrangement 100 further comprises an analog comparator 111, a timer 112 and the CEVTG module 108. This core group of components 110, 111, 112, 108 may provide an arrangement for forming a wide array of different control loops. In the examples that follow, further components in addition to components 110, 111, 112, 108 are described which may further add to the flexibility of the configurable control loop arrangement 100.

The digital-to-analog converter 110 is configured to receive a first-digital-parameter at terminal 116 based on an output voltage from the secondary side 103 of the DC-DC converter 101. In one or more examples, the first-digital-parameter is indicative of a difference between the output voltage from the DC-DC converter 101 and a reference voltage. In one or more examples, said first-digital-parameter is determined by a software implemented module outside the scope of this disclosure.

The digital-to-analog converter 110 is configured to output an analog converter-output-control-signal at terminal 117 based on the first-digital-parameter. The terminal 117 forms the output of the digital-to-analog converter 110 as well as a first input terminal to the analog comparator 111.

The analog comparator 111 is configured to receive the analog converter-output-control-signal. The other, second terminal 118 of the comparator 111 is configured to receive a monitored parameter. The comparator 111 is configured to output a comparison signal based on the difference between the converter-output-control-signal and the monitored parameter at output terminal 120. The monitored parameter is indicative of a property of the primary side of the DC-DC converter, or, more particularly, a property of a component of the primary side 102, such as one of a voltage at, or current flowing to or from, a component of the primary side 102 of the DC-DC converter 101.

Thus, in one or more examples, the configurable control loop arrangement 100 may be configured as a "current control" control loop and the monitored parameter comprises a measure of current in a primary transformer winding of the DC-DC converter 101. In another example, the converter 101 may be of LLC resonant type and the monitored parameter may comprise a first capacitor voltage, wherein the primary side 102 of said DC-DC converter includes an LLC arrangement, wherein the LLC arrangement comprises a first inductor and the first capacitor in series with a parallel arrangement, the parallel arrangement comprising a second inductor in parallel with a primary transformer winding of the DC-DC converter.

The timer 112 is configured to provide one or more timing-signals for use in generation of the control signal. In one or more examples, the timing-signal is used for controlling the comparator 111 in the determination of the comparison signal. In particular, the timing-signal may be used to define a temporal window in which said comparator 111 provides the comparison signal 120. This may be advantageous if the monitored parameter comprises current flow because it will be known to those skilled in the art that the closing of the switches of a DC-DC converter can create ringing and it is undesirable for the comparator to be making a comparison while said ringing is occurring. Thus, the timer 112 allows for windowed operation of the comparator 111 in some configurations of the configurable control loop arrangement.

In general, the timing-signal generated by the timer 112 may be configured to control comparator in the determination of the comparison signal; control the application of the comparison signal to a configurable-event-generation-logic-module; and control the operation of the configurable-event-generation-logic- module; as well as other purposes.

The output from the comparator 111 at terminal 120 is provided as input to the CEVTG module 108.

The CEVTG module 108 may also be configured to receive a general-purpose- input-output signal at terminal 121 and an ADC signal at terminal 122.

The GPIO input terminal 121 may be configured to receive signalling indicative of a request for synchronization of the control loop, during operation, with an external event or for safety shutdown. For example, other components not described herein for controlling the DC-DC converter 101 may request shutdown of the DC-DC converter for safety reasons.

The ADC input terminal 122 may be configured to receive signalling indicative of a request for an over temperature limit shutdown.

The CEVTG module 108 comprises a flip-flop circuit 114 (shown in more detail in FIG. 3). The flip-flop circuit 114 includes a configurable flip flop cell and mode control circuitry and will be described in more detail below.

The mode control circuitry of the flip-flop circuit 114 is configured to enable the flip-flop circuit to operate in a selected mode comprising one of a plurality of modes, wherein said selected mode is selected based on a configure-signal received by the control loop 100. This enables the flip-flop circuit to operate as if it was a plurality of different flip flop types depending on the configuration of the configurable control loop arrangement 100. The configure-signal may comprise several component signals for configuring the various components of the arrangement 100 to cause the configurable control loop arrangement 100 to be configured to form a desired control loop. Thus, a mode-control-circuitry configure signal may be part of the configure-signal, specifically for configuring the mode control circuitry and flip-flop circuit 114.

The CEVTG module 108 is configured to provide for generation of the control signal based on the comparison signal from 120, the timing-signal from timer 112 and the selected mode. The CEVTG module 108 may be further configured to provide for generation of the control signal based additionally on one or more of the GPIO signal 121 and the ADC signal 122 and a PWM signal received at 123.

The CEVTG module 108 may include an AND-OR-INVERT module 113 comprising an arrangement of configurable logic gates which can adopt either of at least a first configuration and a second configuration based on an AND-OR-INVERT-control-signal. The AND-OR-INVERT-control-signal may be part of the signalling that causes the configurable control loop arrangement 100 to be configured to form a desired control loop. The AND-OR-INVERT-control-signal may be one of the configuring signals to cause the arrangement 100 to form a desired control loop. The AND-OR-INVERT-control-signal may be generated by a software controlled process.

The AND-OR-INVERT module 113 may configured to receive at least the comparison signal at terminal 120 and the timing-signal from timer 112 and provide, as an output based on which of the at least first and second configuration is currently adopted, a corresponding first set of values or a different, corresponding second set of values, the first set of values and the second set of values comprising different sets of values which comprise the comparison signal and the timing-signal with different logical operations applied thereto. In one or more examples, the AND-OR-INVERT module 113 further receives the GPIO signal 121 and the ADC signal 122 and the PWM signal received at 123.

The logical operations include one or more of logic AND, logic invert (NOT) and logic OR applied to at least the comparison signal and the timing-signal (and any other input signal applied thereto). The AND-OR-INVERT module 113 may be configured to apply combinations of logical operations. For example, the output at 223 may be configured by software to, in a first example, comprise input 201 AND input 204+(input at 201+(input 202 AND input 203)). In another examples, the configuration of the multiplexers may yield output at 223=(input at 201+input at 203) & (inverted input at 202+inverted input at 204).

It will be appreciated that the generation of the control signal requires the flip-flop circuit 114 to receive different signals depending on the control loop being implemented by the configurable control loop arrangement 100. Those different signals comprise the comparison signal and the timing-signal and, optionally, the GPIO signal 121 and the ADC signal 122 and the PWM signal 123. In one or more examples, the generation of the control signal may require the flip-flop circuit to receive logical combinations or logical variations of said comparison signal and the timing-signal and, optionally, the GPIO signal 121 and the ADC signal 122 and the PWM signal 123. The AND-OR-INVERT module 113 provides said signals and/or logical combinations of those signals for the flip-flop circuit 114. Thus, the AND-OR-INVERT module 113 provide a flexible block for implementation of different control loops by the configurable control loop arrangement 100.

Figure 2:
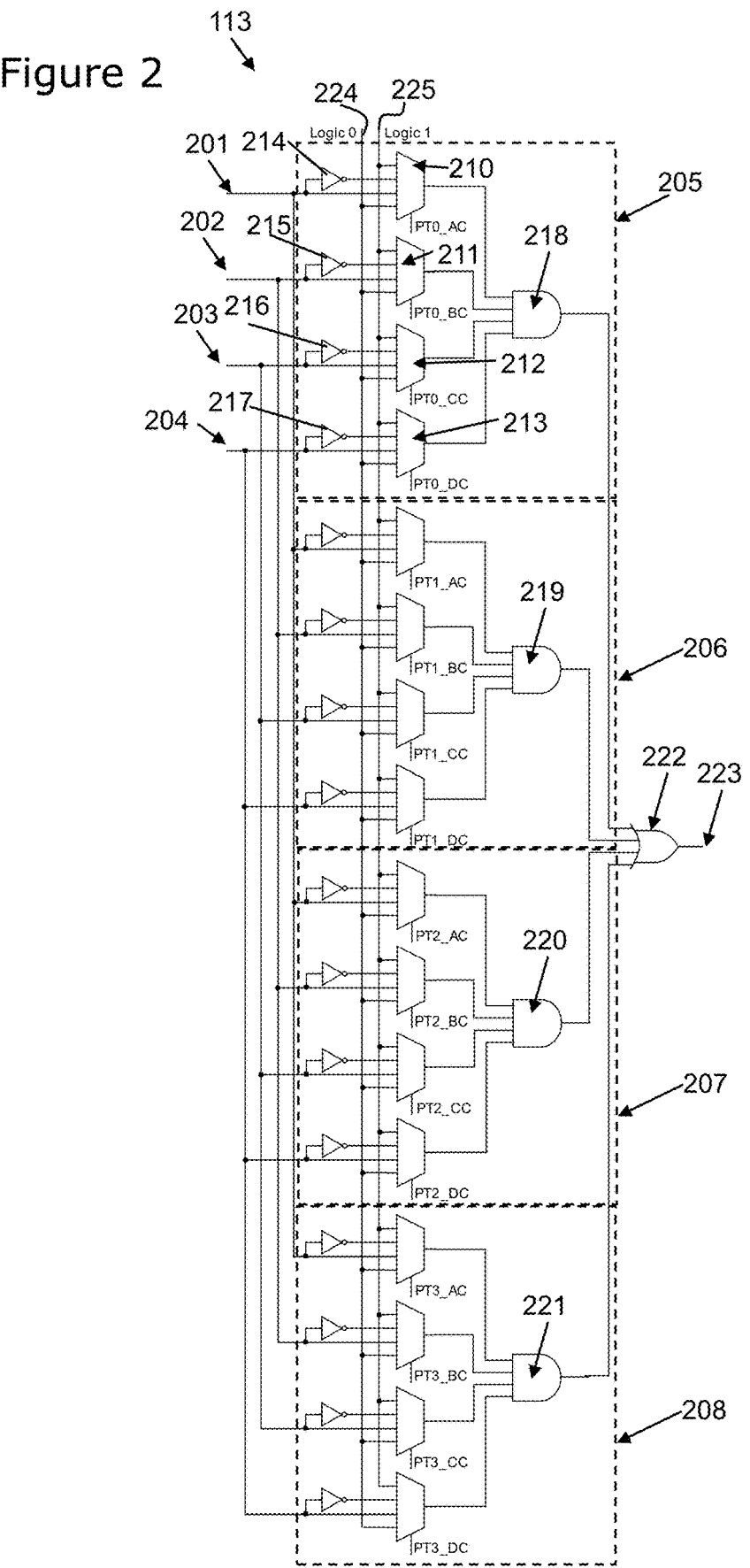
FIG. 2 shows an example embodiment of part of the configurable- event-generation-logic-module, comprising an AND-OR-INVERT module.

FIG. 2 shows an example embodiment of the AND-OR-INVERT module 113. The AND-OR-INVERT module comprises a plurality of inputs 201, 202, 203, 204 (first, second, third, fourth, . . . , Nth) for each of N signals input thereto. Thus, the AND-OR-INVERT module 113 may be configured to receive the comparison signal and the timing-signal and, optionally, one or more of the GPIO signal 121 and the ADC signal 122 and the PWM signal 123. It will be appreciated that some embodiments may include multiple AND-OR-INVERT modules if further logical combinations of the input signals are required. The multiple AND-OR-INVERT modules may be implemented in series or parallel with one another.

In this example the AND-OR-INVERT module 113 comprises a logic high terminal 225 configured to receive a persistent logic high signal and a logic low terminal 224 configured to receive a persistent logic low signal.

The AND-OR-INVERT module comprises a plurality of INVERT-AND arrangements 205, 206, 207 and 208. In this example, there are N INVERT-AND arrangements corresponding to the N inputs, although there may be more or less. Each INVERT-AND arrangement 205-208 receives each of the N input signals. Each of the INVERT-AND arrangements includes N selectors 210, 211, 212, 213 (shown only for INVERT-AND arrangement 205 for simplicity), which may be embodied as N multiplexers. Each selector 210, 211, 212, 213 is configured to receive a different one of the N input signals as well as an inverted version thereof by virtue of inverters 214, 215, 216 and 217. The persistent logic high and logic low signals are also provided to each of the selectors 210-213. Thus, the first selector 210 of each INVERT-AND arrangement 205-208 may be controlled to pass either the signal at input 201 or an inverted version of the signal at the first input 201, i.e. logic 0 or logic 1, or one of the persistent logic high signal or persistent logic low signal. Likewise, the second selector 211 of each INVERT-AND arrangement 205-208 may be controlled to pass either the signal at the second input 202 or an inverted version of the signal at the second input 202, i.e. logic 0 or logic 1, or one of the persistent logic high signal or persistent logic low signal. Likewise, the third selector 212 of each INVERT-AND arrangement 205-208 may be controlled to pass either the signal at the third input 203 or an inverted version of the signal at the third input 203, i.e. logic 0 or logic 1, or one of the persistent logic high signal or persistent logic low signal. Likewise, the fourth selector 213 of each INVERT-AND arrangement 205-208 may be controlled to pass either the signal at the fourth input 204 or an inverted version of the signal at the fourth input 204, i.e. logic 0 or logic 1, or one of the persistent logic high signal or persistent logic low signal, and so on for however many N inputs and INVERT-AND arrangements there may be. In a general case, there are at least two, at least three or at least four inputs and INVERT-AND arrangements 205-208.

Each INVERT-AND arrangement 205-208 includes a logic AND 218, 219, 220 and 221 configured to receive the (selected) output of its respective first to fourth (or N) selectors 210-213 and output a logic AND combination thereof.

The AND-OR-INVERT module 113 further comprises a logic OR 222 configured to receive the output from each of the logic ANDs 218, 219, 220 and 221 of each INVERT-AND arrangement 205-208. The logic OR 222 outputs a logic OR of its inputs at terminal 223.

The selectors 210-213 are individually controlled by a AND-OR-INVERT- control-signal, which may be software derived.

Thus, in summary, the AND-OR-INVERT module is configured to perform any N-in to 1-out Boolean operation including logic AND, logic OR, and/or logic NOT and combinations thereof. The AND-OR-INVERT module may also be configurable to provide said logical operations further based on said persistent logic high and logic low signals in one or both of the first configuration and the second configuration.

As an example, in the AOI module 113, it can be configured to provide various Boolean operations by software. In FIG. 2, the selector 210 may receive a AND-OR-INVERT-control-signal designated PT0_AC, the selector 211 may receive an AND-OR-INVERT-control-signal PT0_BC, the selector 212 may receive an AND-OR-INVERT-control-signal PT0_CC, and the selector 213 may receive an AND-OR-INVERT-control-signal PT0_DC.

In one or more examples, an AND-OR-INVERT-control-signal of "00" may force the output of the selector to a logical zero. An AND-OR-INVERT-control-signal of "01" may pass the input signal. An AND-OR-INVERT-control-signal of "10" may pass a complement of the input signal. An AND-OR-INVERT-control-signal of "11" may force the output of the selector to a logical one.

For example, if the AND-OR-INVERT-control-signal sets PT0_AC=01, PT0_BC=10; PT0_CC=10; and PT0_DC=01; then the output at terminal 210=input at 201; the output of selector 211 is the inverted version of the input at 202; the output of selector 212 is the inverted version of the input at 203; the output of selector 213=the signal at input 204. So, the output of the logic AND 218 is (using the reference numerals of the terminals to reference the signals applied thereto at any one time) 201& (~202)&(~203)&204.

Figure 8:
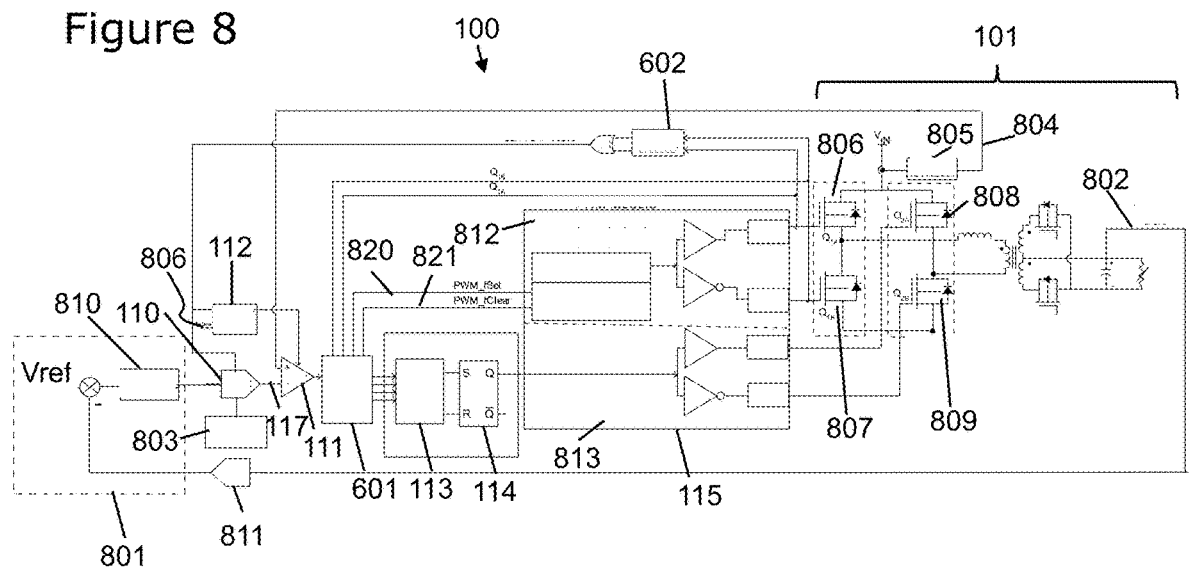
FIG. 8 shows an example embodiment of the configurable control loop arrangement in a configuration that provides a control loop of a DC-DC converter comprising a Phase Shift Full Bridge (PSFB)
Figure 11:
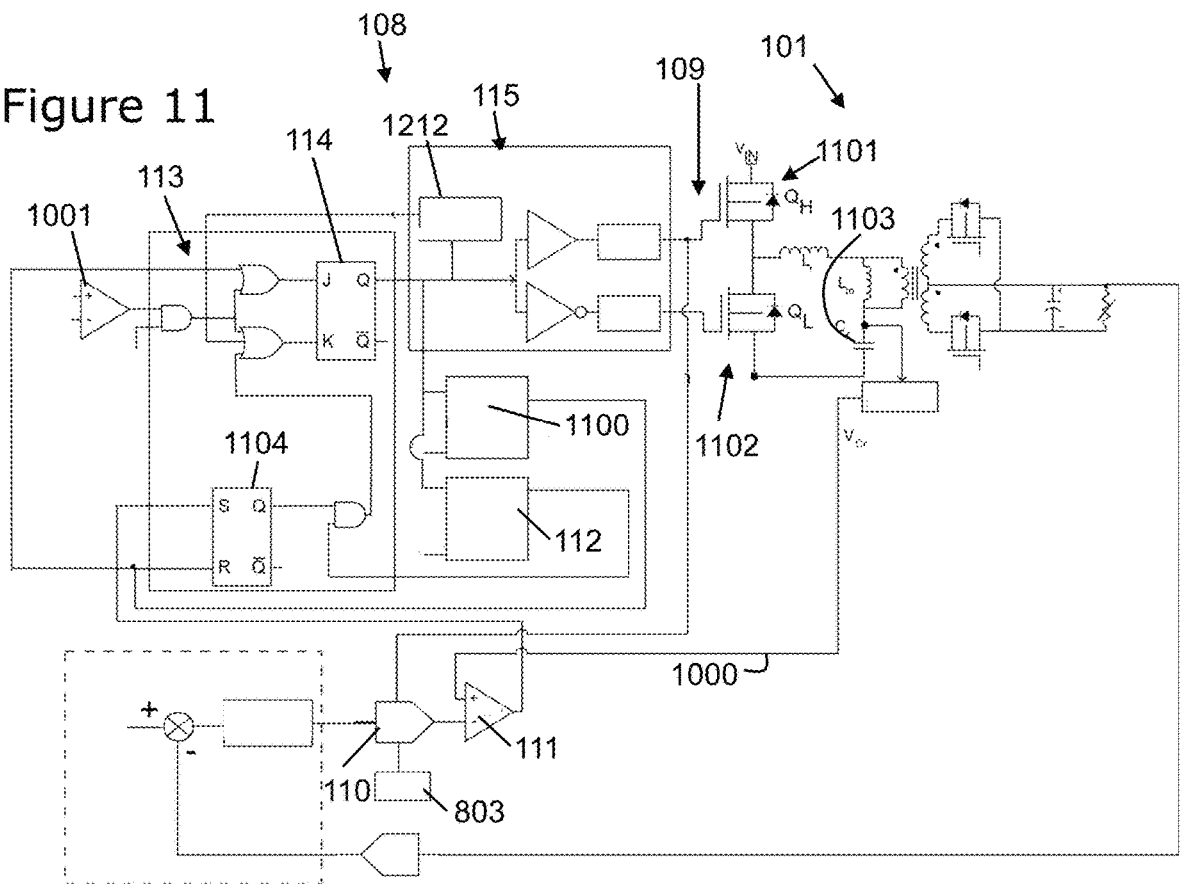
FIG. 11 shows a more detailed example embodiment of the control loop of FIG. 10.

It will be appreciated that all of the logic gates provided for in the examples of FIG. 8 and FIG. 11 that follow are generated by the AOI module 113 (or further AOI modules as required).

Thus, in summary, the AND-OR-INVERT module may be configured to output logical combinations of the input signals including one, two or three or more of the input signal(s) unmodified, a logic NOT version of the input signal(s), a logic AND combination of two or more input signals, a logic AND combination of three or more input signals or logical modifications thereof and a logic OR of the one or more input signals or logical versions/combinations thereof.

Thus, as an example, if signal A is received at 201, signal B at 202, signal C at 203 and signal D at 204, the AND-OR-INVERT module 113 can formalize any logic combination, a few of which are shown in the table below:

| Event Output Expression | PT0 | PT1 | PT2 | PT3 |
|---|---|---|---|---|
| A & B | A & B | 0 | 0 | 0 |
| A & B & C | A & B & C | 0 | 0 | 0 |
| (A & B & C) + D | A & B & C | D | 0 | 0 |
| A + B + C + D | A | B | C | D |
| (A & ~B) + (~A & B) | A & ~B | ~A & B | 0 | 0 |

PT0, PT1, PT2 and PT3 represent the output of each of the INVERT-AND arrangements at the output of the logic ANDs 218, 219, 220, 221 respectively.

FIG. 3 shows an example embodiment of the flip-flop circuit 114. The flip-flop circuit comprises the flip-flop cell 300 and mode control circuitry 301 that surrounds the flip-flop cell 300. In this example, FIG. 3 shows the flip-flop circuit 114 receiving input from two AND-OR-INVERT modules 113.

The mode control circuity 301 includes a first input 302 configured to receive the output from a first of the AND-OR-INVERT modules 113. The mode control circuity 301 includes a second input 303 configured to receive an output from a second of the AND-OR-INVERT modules 113. In general, only one of the inputs 302,303 may be received by an AND-OR-INVERT module 113, wherein the other may comprise one of the timing-signal and the comparison signal. The first and second input may pass through an optional filter 304, 305 respectively.

The signals at the first input 302 and the second input 303 are coupled to an first output multiplexer 306 and a second output multiplexer 307 respectively. The first output multiplexer 306 and the second output multiplexer 307 each receive a further signal. The first output multiplexer 306 receives a first, Q-output 308 from the flip-flop cell 300. The second output multiplexer 307 receives a second, Q̄-output (Q-complement-output) 308 from the flip-flop cell 300. Thus, the first output multiplexer 306 is configured to select either the first input 302 to the flip-flop circuit 114 or the first, Q-output 308 as a first output at first output terminal 311. Thus, the second output multiplexer 307 is configured to select either the second input 303 to the flip-flop circuit 114 or the second, Q̄-output 310 as a second output at second output terminal 311. The first and second output at 311 and 312 comprise the control signal of the control loop 100 (subject to PWM processing in this example).

The flip-flop cell 300 comprise a delay flip flop but, by action of the mode control circuitry 301, the flip flop circuit 114 may act as any one of a set-reset flip flop; a delay flip flop; a T flip flop; and a JK flip flop.

The flip flop cell 300 receives the second signal from input 303 at a C-input terminal 314. A D-input terminal 313 is coupled to the output of a combinational logic block 315. The combinational logic block 315 provides either the first signal from 302 or the second, Q-output 310 to the D-input terminal. The selection of the input to the first D-input terminal 313 by the combinational logic block 315 may, at least in part, determine the mode of the flip-flop circuit 114. The configuration of the combinational logic block 315 may set by a software derived combinational-logic-block-configure-signal.

A reset input 316 to the flip-flop cell 300 is based on a logical AND 321 combination of the first input 302 and a RS-mode-signal 319, and, optionally, a logical OR 322 of an async-reset-signal from terminal 317 and the output of the logical AND block 321. The provision of the RS-mode-signal 319 and the async-reset-signal 317 may be software controlled.

A set input 318 to the flip-flop cell 300 is based on the second input 303 in logic AND 323 combination with a RS-mode-signal 320. The RS-mode-signal 320 may be software controlled.

In FIG. 3, the Q-output 310 is shown being fed back to a feedback override block 330, which is configurable to selectively provide the Q-output of the flip-flop cell 300 to the AND-OR-INVERT module(s) 113.

The action of the combinational logic block 315 (determined by the combinational-logic-block-configure-signal), the RS-mode-signal at 319, and the RS-mode-signal at 319 may define the mode of the flip-flop circuit 114. Thus, the action of the combinational logic block 315, the RS-mode-signal at 319, and the RS-mode-signal at 319 configure the configurable control loop arrangement 100 to operate as a particular control loop.

Example FIGS. 4A to 4D shows a plurality of embodiments illustrating how configuration of the mode control circuitry 301 can cause the flip flop cell 300 to operate in a plurality of different modes that result in it operating as any one of a plurality of different flip-flop types. FIG. 4A shows a reset-set flip flop 400. FIG. 4B shows a D flip-flop 401. FIG. 4C shows a D latch flip-flop 402 and FIG. 4D shows a T flip flop 403. The flip flop circuit 114 may also operate as a JK flip-flop.

Returning to FIG. 1, in one or more examples, the control signal generated by the flip-flop circuit 114 is applied to the DC-DC converter 101 via a pulse width modulation, PWM, generator 115. Thus, the control of the switches of the DC-DC converter may be controlled by PWM signalling generated by the PWM generator 115 based on the control signal from the output of the flip-flop circuit 114.

The PWM generator 115 is configured to generate one or more PWM signals based on the control signal generated by the flip-flop circuit 114, said PWM signal configured to apply a switching pattern to switches of the DC-DC converter. Thus, the switches of the primary side 102 may receive said one or more PWM signals.

The PWM generator may contains PWM submodules, each of which is set up to control a single half-bridge power stage.

The PWM generator may include fault channel support. This PWM generator may be configured to generate various switching patterns, including highly sophisticated waveforms, based on the control signal. It can be used to control different Switched Mode Power Supplies (SMPS).

Figure 5:
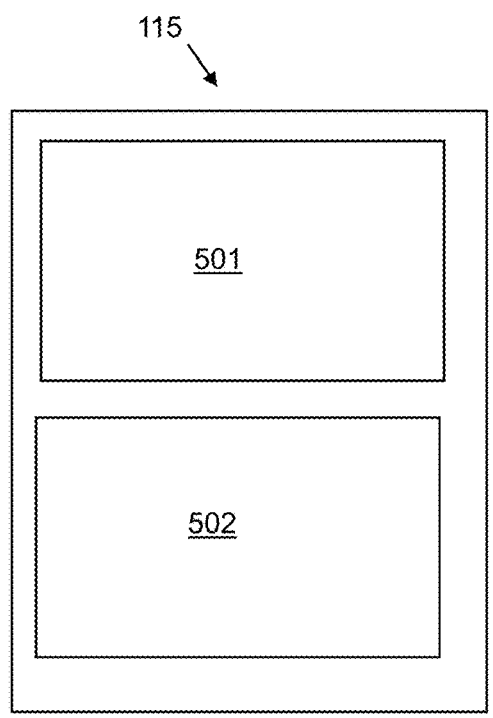
FIG. 5 shows an example PWM generator.

FIG. 5 shows the PWM generator 115 comprise a first part 501 and a second part 502. The first part 501 may be configured to control a first high switch and a first low switch of the DC-DC converter. The second part 502 may be configured to control a second high switch and a second low switch of the DC-DC converter. The first part 501 may generate control signal based on a fixed duty cycle. The second part 502 may be configured to generate a PWM version of the control signal from the flip-flop circuit.

Figure 6:
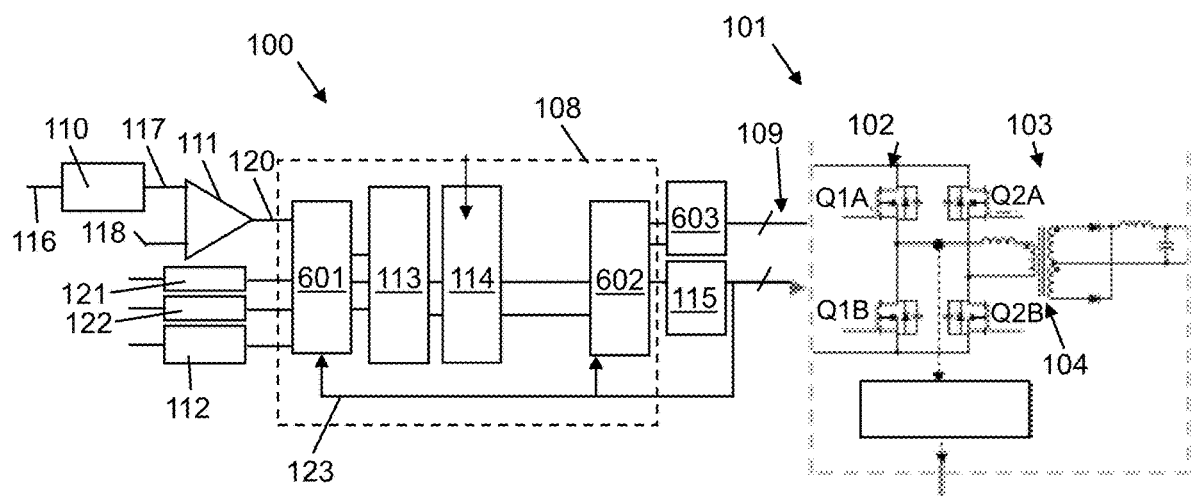
FIG. 6 shows a second example embodiment of a control loop of a DC- DC converter.

FIG. 6 shows a second example embodiment. Many of the parts are similar to that shown in example FIG. 1 and like reference numerals have been used for like parts.

This second embodiment differs in terms of the CEVTG module 108 comprising a first multiplexer arrangement 601 comprising a plurality of multiplexers. The first multiplexer arrangement 601 is configured to route one or more signals received at a plurality of input terminals to the same or a greater number of output terminals, wherein the multiplexer arrangement 601 is reconfigurable in that connections formed between the input terminals and the output terminals are reconfigurable. The first multiplexer arrangement 601 may be advantageous in terms of the flexibility of the configurable control loop arrangement 100. Being able to flexibly direct the comparison signal and timing-signal to the different hardware components 113, 114, 115 makes the arrangement 100 more configurable to adopt a chosen control loop configuration.

The second embodiment also differs in terms of the CEVTG module 108 comprising a second multiplexer arrangement 602 comprising a plurality of multiplexers. The second multiplexer arrangement 602 is configured to route one or more signals received at a plurality of input terminals to the same or a greater number of output terminals, wherein the multiplexer arrangement 602 is reconfigurable such that connections formed between the input terminals and the output terminals are reconfigurable. Being able to flexibly direct the output from the flip-flop circuit 114 to the different hardware components 603, 115 makes the arrangement 100 more configurable to adopt a chosen control loop configuration.

The first multiplexer arrangement 601 is configured to receive the comparison signal at 120, the timing-signal from timer 112 and, optionally, the signal from ADC 122, the signal from GPIO 121, a PWM signal from a PWM generator 114, an output from a second multiplexer arrangement 602, and an output from a counter 1100 (which will be described later). The output from the first multiplexer arrangement 601 is provided to the AND-OR-INVERT module 113.

The timer 112 may be configured to generate a guidance signal for the AOI module(s) 113, 603. The AOI module 113, 603 may be configured to perform a different logic equation depending on the status of the timing-signal signal appeared.

The second multiplexer arrangement 602 is configured to receive the output from the flip-flop circuit 114. The output from the second multiplexer arrangement 602 is provided to the PWM generator 115 and a second AND-OR-INVERT module 603. The second AND-OR-INVERT module 603 is substantially the same as the first AND-OR-INTERT module 113. Accordingly, it is configured to provide, at its output (shown generally as 109 in FIG. 6), logical combinations of the signals provided at its inputs.

The output from the second AND-OR-INVERT module 603 comprises a synchronized rectifier control signal. However, such a signal may not be required in all implementations in which the configurable control loop arrangement 100 is configured to implement a particular control loop.

The output from the PWM generator 115 comprises the control signal for controlling the switches of the DC-DC converter 101.

Figure 7:
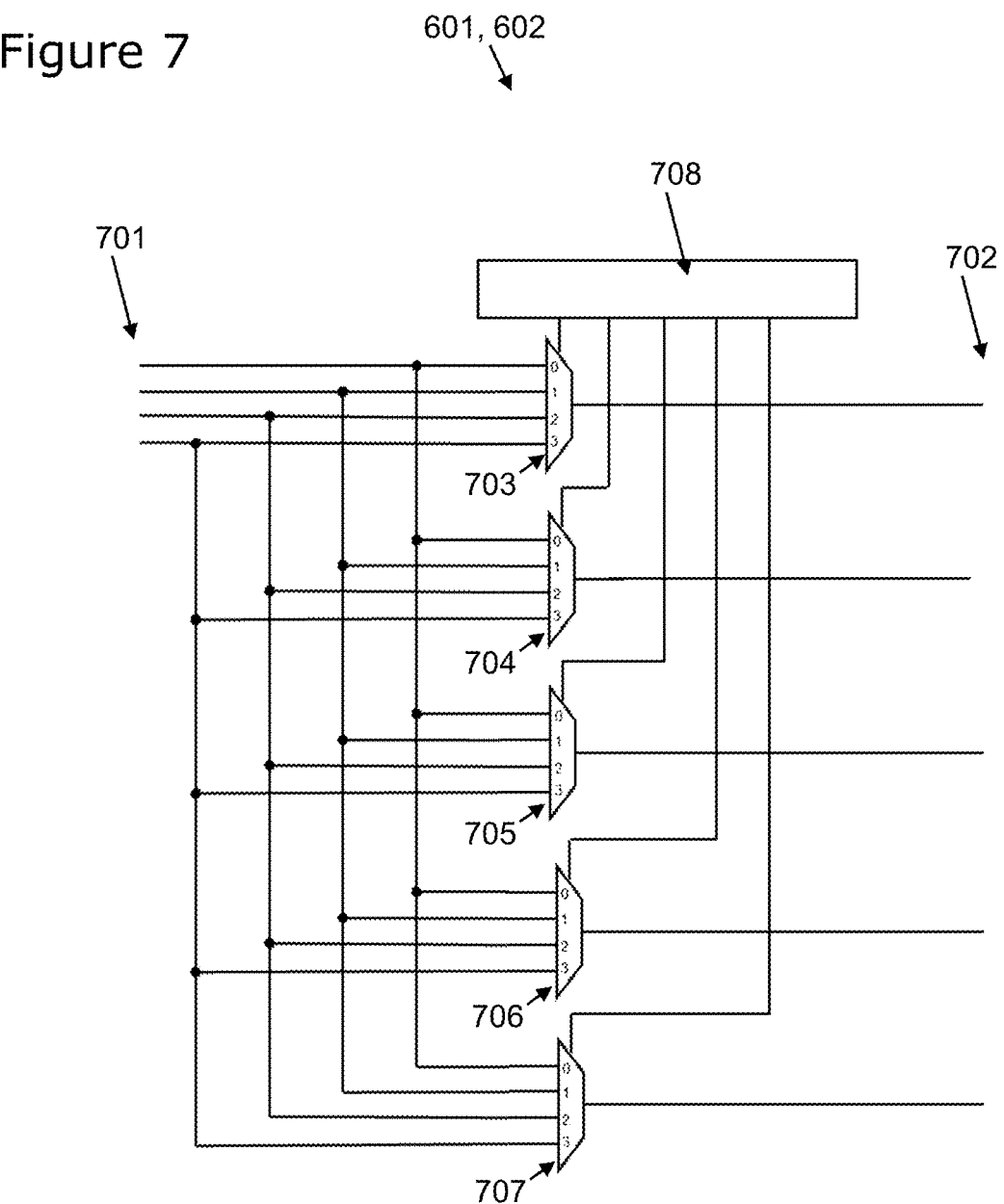
FIG. 7 shows an example embodiment of multiplexer arrangement for routing each of a plurality of input signals received at a corresponding plurality of input terminals to a particular output terminal of a set of output terminals to provide for a reconfigurable control loop.

FIG. 7 shows an example embodiment of either of the first multiplexer arrangement 601 or the second multiplexer arrangement 602. The multiplexer arrangements 601, 602 are advantageous in that they are configured to route signals received at the inputs to any one of a plurality of outputs depending on a control signal. This may enable the configurable control loop arrangement 100 to be more configurable in that the signals received at the input 701 can be routed and, optionally, duplicated such that the same input signal is provided at a plurality of output terminals.

The multiplexer arrangement 601, 602 comprises a plurality of input terminals 701, in this example four. The multiplexer arrangement 601, 602 comprises the same number or a greater number of output terminals 702, in this example five. The multiplexer arrangement 601, 602 comprises a plurality of multiplexers 703-707 corresponding to the number of output terminals 702.

Each of the plurality of multiplexers 703-707 are configured to receive all of the input signals from the input terminals 701. However, in other examples, it will be appreciated some of the multiplexers may not need to receive all of the input signals. Said input signals at the input terminals may include said comparison signal. The plurality of multiplexers are configurable to direct the plurality of input signals to predetermined output terminals based on a multiplex-selection-signal. Thus, in instances where the outputs of the multiplexer arrangement is coupled with another component, it is able to route a signal received at any one of its inputs to any one of its outputs for receipt by the another component and therefore different terminals of the another component. Thus, for example, where the flip-flop circuit 114 or the AND-OR-INVERT module 113 is required to perform operations on different input signals, the multiplexer arrangement 601, 602 can direct the appropriate signal to an appropriate terminal of the flip-flop circuit 114 or the AND-OR-INVERT module 113 so that the operation can be performed.

Each of the plurality of multiplexers 703-707 receives the multiplex-selection-signal from interface 708 which defines which of the input signals each multiplexer 703-707 is configured to pass to its corresponding output terminal 702. The interface 708 may receive a software generated multiplexer-control signalling that provide for said multiplex-selection-signals. The multiplexer-control signalling may be part of the signalling that causes the configurable control loop arrangement 100 to be configured to form a desired control loop.

FIG. 8 shows the configurable control loop arrangement 100 having been configured to operate as a control loop of a DC-DC converter of Phase Shift Full Bridge (PSFB) type. Thus, the hardware components, including said DAC 110, timer 112, comparator 111, said multiplexer arrangement 601, 602, AND-OR-INVERT module 113, 603, flip-flpp circuit 114, are set to a configuration that causes them to present the circuit shown in example FIG. 8. The same reference numerals have been used for like parts.

In a PSFB application, the DAC 110 is coupled to a software implemented element 801 which provides it with the first-digital-parameter. The element 801 is coupled to the secondary side of the DC-DC converter 100 at 802 and generates the first-digital-parameter based on the output voltage of the secondary side of the DC-DC converter 100. The block 801 shows the first- digital-parameter comprising a difference between the voltage output at the secondary side and a reference voltage. In one or more examples the DAC receives a slope control signal from block 803. It will be appreciated by those skilled in the art that slope control block 803 may provide for stabilization of the current loop by controlling the output from the DAC 110 to gradually reduce the output therefrom per a software programmed slope.

The comparator 111 receives the output from the DAC 110 at its input 117 and a monitored parameter at the second input terminal 118. In this implementation of the configurable control loop arrangement 100, the second input terminal 118 is coupled to receive a measure of the current flowing in the primary side of the converter 101 at 804 via an optional signal normalization block 805 for normalizing the current measurement.

The timer 112 is configured to (optionally by way of the action of the first multiplexer 601) receive a signal based on the control signal generated by the PWM generator 115. The timer 112 also receives the PWM signal from PWM generator 115 at 806. The timing-signal from the timer is used to control when the comparator 111 provides the comparison signal. It will be known to those skilled in the art that ringing can occur on opening and closing of the power switches of the DC-DC converter and the timing-signal can be used to provide a windowed determination of the comparison signal to mitigate the effects of the ringing in the determination of the comparison signal.

The input terminals of the first multiplexer 601 are configured to receive the comparison signal and the PWM signal from the PWM generator 115. In particular, the PWM signals received control the high and low first switches 806, 807 of the converter 101 and are termed Q1A and Q1B respectively.

The output terminals of the first multiplexer 601 couple to the AND-OR-INVERT module 113 and provide the signalling to control the flip-flop circuit 114. The input terminals of the first multiplexer 601 also couple to the PWM generator 115 and receives two signals PWM_fSet 820 and PWM_fClear 821. PWM_fSet and PWM_fClear may comprise software defined signals that force set the SR flipflop cell 114, and force clear SR flipflop cell 114.

Thus, the first multiplexer 601 routes the two signals PWM_fSet 820 and PWM_fClear 821 from PWM generator 115 to the AOI 113. One of input terminals of the first multiplexer 601 receives the comparison signal from 111 and 601 routes it to AOI 113. If the comparator 117 generates a pulse (shown as 911 in FIG. 9), then AOI 113 sends it to R-S flip-flop 114 in the CEVTG. Otherwise, signals PWM_fSet 902 and PWM_fClear 903 are fed to R-S flip-flop 114 in the CEVTG, as will be described in relation to the example timing diagram of FIG. 9.

The output of the AND-OR-INVERT module 113 thus provides a set signal and a reset signal for the flip-flop circuit 114. The mode control circuitry configures the flip-flop cell, in this embodiment to operate as a set-reset flip-flop. The first multiplexer 306 is configured to provide the Q-output 308, 311 top the PWM generator 115 for generation of the PWM version of the control signal.

A second multiplexer arrangement 602 may or may not be required to apply the PWM control signal to the high and low second switches 808, 809 of the converter 101. It will be understood that the term PWM control signal covers discrete component signals thereof used for controlling the individual switches of the converter.

The PWM generator 115 also provides the PWM control signal (e.g. component signals thereof) to the high and low first switches 806, 807 of the converter 101. It will be appreciated that the component signals may cause the high and low first switches 806, 807 to operate with a 50%/50% duty cycle.

In summary, the control loop formed by the configurable control loop arrangement 100 manipulates the primary side winding current of the transformer of the DC-DC converter according to a current reference which is the PI (proportional integral) controller 810 output of voltage regulator. The PI controller of the voltage regulator includes an ADC 811 which comprises part of an outer voltage control loop implemented by software.

In order to precisely control DC-DC converter 101 current, the current loop calculation rate must be the same PWM pulse generation rate in order to achieve cycle-by-cycle control. This is difficult to be realized by software. The use of the configurable components 110, 111, 112, 114 and optionally 601, 113 and 115 of the configurable control loop arrangement 100 is advantageous as it allows a hardware digital feedback control loop to be created that may operate without software intervention in normal operation.

Detail operation is described below. The PWM generator 115, in this example, includes a Sub-Module0 812 which controls the high and low first switches 808, 809 (designated Q1A & Q1B), where a fixed 50% duty cycle complementary waveforms are applied through an internal pulse generator (see FIG. 9 for the waveform). The high and low second switches 808, 809 (designated Q2A & Q2B) are which is controlled by a PWM Sub-Module1 813. The Sub-Module1 generates complementary waveforms based on the control signal output by the flip-flop circuit 114, which in this example is configured as a RS flip-flop.

Figure 9:
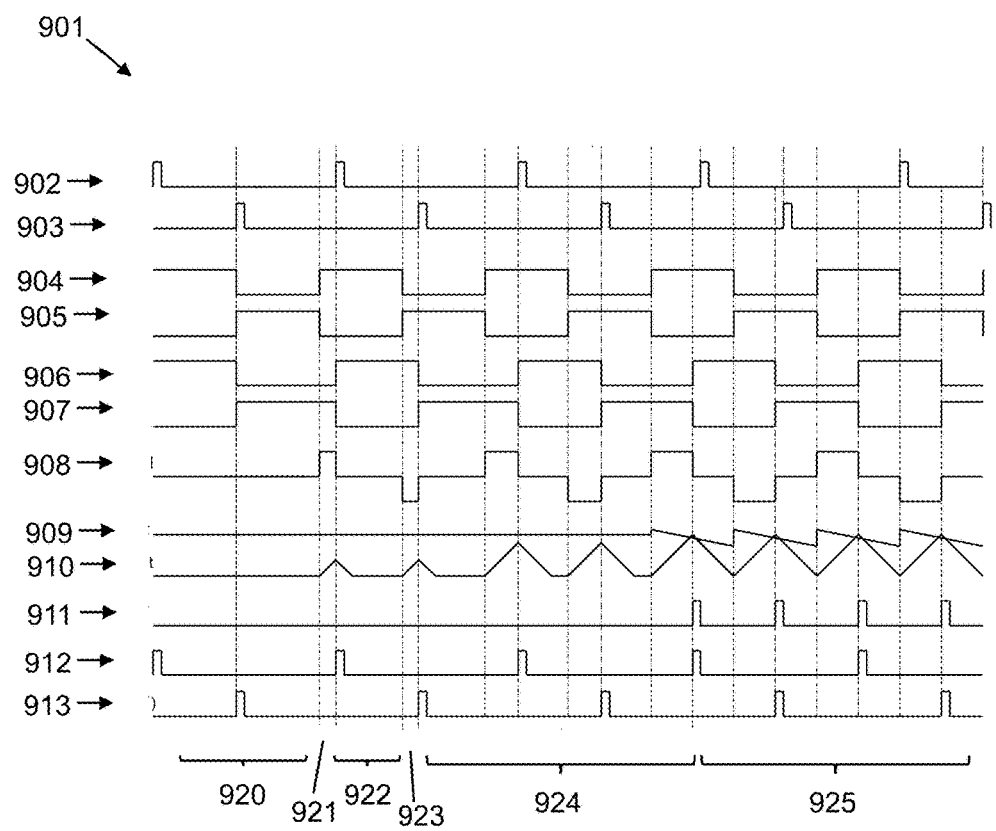
FIG. 9 shows an example timing diagram for various signals of the example control loop of FIG. 8.

FIG. 9 shows a timing diagram 901 wherein:

902 shows PWM_fSet, the signal on line 820, from the PWM generator 115 to the first multiplexer 601.

903 shows PWM fClear, the signal on line 821, from the PWM generator 115 to the first multiplexer 601.

904 shows the switching of a first high switch Q1A 806 of the DC-DC converter.

905 shows the switching of a first low switch Q1B 807 of the DC-DC converter.

906 shows the switching of a second high switch Q1B 808 of the DC-DC converter.

907 shows the switching of a second low switch of the DC-DC converter.

908 shows the voltage across the primary winding of the DC-DC converter.

909 shows the output of the DAC 110.

910 shows the current through the primary winding of the DC-DC converter.

911 shows the output at 120 of the comparator 111.

912 shows a signal "set" comprising the output of the AOI module 113 to a S input 318 of the flip-flop circuit at 114. The AOI uses the following Boolean equation to generate this signal: PWM_fSet|(Q1A switch 806 status & comparison signal)

913 shows a signal "clear" comprising the output of the AOI module 113 to a R input 316 of the flip-flop circuit at 114. The AOI uses the following Boolean equation to generate this signal: PWM_fClear|(Q1B switch 807 & comparison signal)

It should be noted that in the timing diagram dead-time insertions are ignored for clearer timing illustration.

At stage 920, the control loop system is in an idle stage in which there is no output to the load.

At start up stages 921, 922, 923, the switches Q2A & Q2B controlled by PWM_fSet (short for PWM force Set) and PWM_fClear (short for PWM force Clear) signals are generated from Sub-Module0 812 which are synchronized with Q1A & Q1B control signals. Both signals feed to the AND-OR-INVERTER module 603 at 820, 821 through the first multiplexer 601. The Q2A power switch is then set and clear by these two signals. The Q2B signal is complementary to Q2A. PWM_fSet pulse turns ON Q2A after a deadtime insertion, and its complementary signal turns OFF Q2B; PWM_fClear turns OFF Q2A and its complementary signal turns ON Q2B after a deadtime insertion. Software gradually increases the PWM_fSet delay that is relative to Q1A rising edge in startup stage until maximum delay is reached. It will be appreciated that in FIG. 6 the signal at 123 is PWM_fSet and PWM_fClear. Because of the delay, current in the primary transformer winding of the DC-DC converter (or called winding) is established from Vin-> Q1A ->primary transform winding- >Q2B ->GND and alternatingly Vin->Q2A ->primary transform winding-> Q1B ->GND. Due to the gradual increase of the PWM_fSet delay in relative to Q1A rising edge, the current in primary winding is gradually increased due to longer voltage pulses are applied to the transformer.

At Stage 924 software determines that the current at 804 reaches a target value, and control loop can enter stage 925. At end of stage 924, software control provides for an increase in the PWM_fSet delay that is relative to Q1A rising edge to predetermined maximum. This predetermined maximum delay also provides for the maximum power transfer period limit if cycle-by-cycle controlling using analog comparator 111 and DAC 110 fail. Also DAC slope compensation 803 is also enabled for reference current generation.

At stage 925, the current loop 100 takes complete control of the DC-DC converter without software intervention. Thus the hardware blocks of DAC 110, comparator 111, flip-flop circuit 114 and PWM module 115 provide the functionality of the control loop. The output from the comparator 111 (CMP_OUT) is used to turn on/off the switches Q2A and Q2B. In order to make sure Q2A and Q2B are in synchronous to Q1A and Q1B, Q2A can only be turned on when Q1A is already on; Q2A can only be turned off when Q1A is already off (or Q1B is on because Q1A and Q1B are complementary pair). The configurable-event-generation-logic-module performs the logic operation and turns on/off slave half-bridge (phase B) using the following logic.

Set=PWM_fSet|(Q1A & CMP_OUT)
Reset=PWM_Clear|(Q1B & CMP_OUT)

With above trigger condition, the hardware current loop 100 executes the primary current soft start operation by smoothly by adjusting PWM_fSet location and PWM_fClear location at stages 920, 921, 922, 923 and 924. At stage 924 the current comparator 111 starts work properly, after the comparator status have confirmed by software, the PWM_fSet and PWM_fClear will relocate to the end of a positive energy transfer period and the end of a negative energy transfer period respectively (maximum delay respects to Q1A rising edge). This turns the converter into current control mode. In the current control mode, PWM_fSet and PWM_fClear act as end of energy transfer period boundaries (it will be appreciated that PWM_fSet and PWM_fClear only act as end of energy transfer period boundaries if signal 911 fails). At each energy transfer period boundary, one of these two trigger signals force slave half- bridge switching if the control target cannot meet. At stage 925, the control target is reached, CMP_OUT signal triggers Set-Reset flip-flop set at a first energy transfer period (Vin->Q1A->primary transform winding->Q2B-> GND), and CMP_OUT signal triggers a flip-flop reset at second energy transfer period (Vin->Q2A ->primary transform winding->Q1B ->GND). These trigger signals for set-reset flip-flop 114 accomplish primary current control from soft startup to current control mode.

When either Q1A or Q1B turn on, the moment of turn-on may cause the current ringing (as mentioned above), this ringing may cause ringing to appear in the comparison signal output by the analog comparator 111. To avoid this problem, the triggered timer 112 is used to create a short blank window (around 200ns) in which the comparison signal output is suppressed.

The rising edge of Q1A and Q1B also resets DAC 110 output to start new ramp down of its output (This ramp-down is called slope compensation). The slope of DAC slope compensation is pre-predefined based on the load characteristics. Slope compensation generation operates automatically. The peak of DAC 110 output is set by software based calculation of voltage loop output.

In summary, this mixed signal control loop 100 utilizes the configurable AND-OR-INVERTER module 113, 603 and a configurable flip-flop cell 300 to implement soft-start and peak current control mode PSFB converter manipulation sequences. It may be configured to execute all full bridge modulation modes include: forward conduction, slave half-bridge transition, forward freewheeling, master half bridge transition, backward conduction, slave half bridge transition, backward freewheeling, and master half-bridge transitions repetitively.

Figure 10:
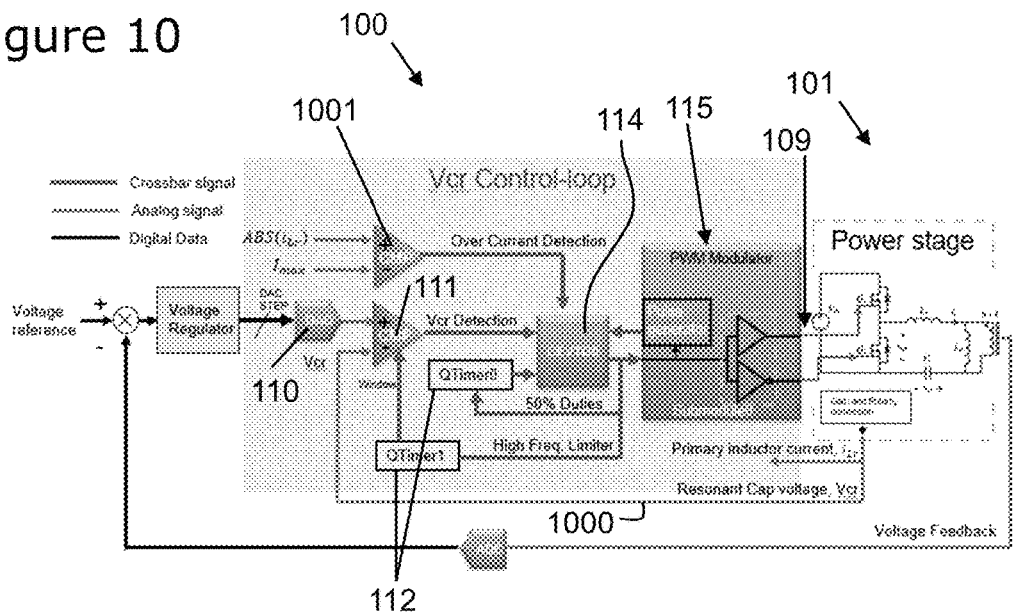
FIG. 10 shows an example embodiment of the configurable control loop arrangement in a configuration that provides a control loop of a DC-DC converter comprising a Half bridge LLC converter.

FIG. 10 shows an example in which the configurable control loop arrangement 100 has been configured for forming a control loop of a Half bridge LLC type DC-DC converter 101. Example FIG. 10 shows the DAC 110 receiving an input indicative of the voltage of the output from the DC-DC convertor. The comparator 111 receives the converter-output-control-signal as well as a monitored parameter, which comprises the resonant capacitor voltage in this example at 1000. The timer 112 provides the timing-signal to the comparator 111 (such as via a first multiplexer 601) as well as to the configurable-event-generation-logic-module and, in particular, to the flip-flop circuit 114 (such as via the first multiplexer 601). This embodiment includes a second comparator 1001 configured to provide "over current detection" and provides an over-current-detection-signal to the configurable-event- generation-logic-module.

Example FIG. 11 shows a more detailed view of the configurable control loop arrangement 100 of FIG. 10. The flip-flop circuit 114, by virtue of the mode control circuitry is configured as a J-K flip flop. The AND-OR-INVERT module 113 is represented by the logic between the comparator 111 and the flip-flop circuit 114. The first multiplexer 601 is not shown but, as described above, provides the connections between the components shown in FIG. 11. In this embodiment, the configurable control loop arrangement includes a counter 1100 configured to receive a clock signal and a "direction" signal. The direction signal is derived from the output of the flip-flop circuit 114, i.e. the control signal before it is applied to the PWM generator 115.

In this example, the "control target" is resonant capacitor voltage termed Vcr 1000. The control loop 100 may be configured to execute soft-start, burst- mode and Pulse-frequency modulation (PFM) mode. Charge-controlled LLC regulates converter power through the variation of resonant capacitor voltage Vcr.

The first-digital-parameter is indicative of an output voltage Vout from the secondary side of the DC-DC converter and is provided through the DAC 110. At the beginning of each switching cycle, the high side switch QH 1101 turns ON, the resonant capacitor 1103 voltage $v_{cr}$ is compared to converter-output-control-signal output from the DAC, and when $v_{cr}$ is greater than the DAC output, the high side switch QH is turned OFF. The low side switch $Q_L$ 1102 turns ON after a dead time delay. The conductive time (duration) of the low side switch $Q_L$ 1102 shall be equal to the high side switch $Q_H$ 1101 to prevent transformer magnetic core saturation. After the low side switch $Q_L$ turns OFF, the high side switch $Q_H$ is turned ON again for the next cycle operation.

In this control scheme, the switching frequency is managed by the configurable control loop arrangement comprising the DAC 110, comparator 111 and configurable-event-generation-logic-module 108 and PWM generator 115.

We now turn to the operation of the counter 1100. The counter provides an automatic duty inter-lock mechanism between high side switch QH and low side switch QL. This ensures an equal duty cycle. It will be appreciated that switching frequency limitation is crucial to balance magnetic flux.

The J-K flip-flop 114 Q-output in CEVTG 108 controls the high side switch 1101 and low side switch 1102 thought a half bridge controller in the PWM generator 115. When J-K flip-flop 114 output is set, high side switch turns ON, when J-K flip-flop output is clear high side switch turns OFF and low side switch turns ON after a predefined dead time.

The counter 1100 performs an equal duty cycle track. It is configured as an up/down counter to count a given clock, for example a 100 Mhz clock.

When high side switch $Q_H$ 1101 is ON, the counter 1100 is configured to count up.

When high side switch $Q_H$ 1101 is OFF (QL is ON because $Q_H$ and $Q_L$ are a complementary pair), the counter 1100 counts down.

When the counter value of the counter 1100 reaches zero, it is configured to generate a pulse. This pulse sets the Q-output of the J-K flip-flop 114 to a high state which is to turn ON the high side switch QH 1101 and turn OFF the low side switch QL 1102. It also resets the output Q of RS Flip-Flop 1104 to low state. This completes an on/off cycle. It will be appreciated that the flip-flop circuit 114 provides the functionality of the RS Flip-Flop 1104.

Figure 12:
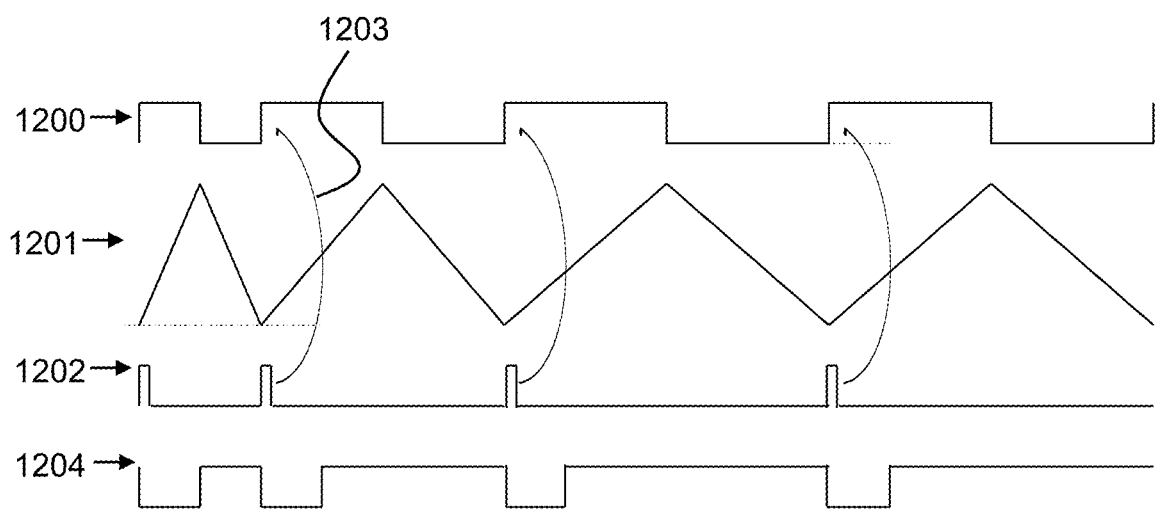
FIG. 12 shows an example timing diagram for operation of a counter of the configurable control loop arrangement.

FIG. 12 shows an example timing diagram. Trace 1200 shows the status if the high side switch of the DC-DC converter 101. The direction of the counter is controlled by the state of the high side switch 1101.

Trace 1201 shows the counter counting up and down. Trace 1202 shows the output from the counter 1100 when it reaches a zero count value. The arrows 1203 show how the pulse from the counter 1100 is used to control the switching on of the high side switch $Q_H$ 1101.

Trace 1204 shows the timing-signal output from the timer 112. In this example a second timer 1212 is present.

The timer 112 is used to limit the maximum PWM frequency. $Q_H$ 1101 turn-on signal triggers the timer 112 to output a low state. The duration of the low state is the minimum ON time of $Q_H$ 1101, because smaller than the minimum on time can damage the $Q_H$ Transistor. This low state is logic AND combined (by the action of the AND-OR-INVERT module 113) with the Q-output of the RS Flip-Flop 1104 to ensure that QH 1101 is ON not less that minimum ON time in the event that Vcr at 1000 rises too fast.

The second timer 1212 is used to limit the minimum PWM frequency (or maximum QH 1101 ON time). It is reset at a QH 1101 turn-on edge to output the low state. If a delay elapsed time is expired, it outputs a high state pulse which sets Q-output of the J-K flip-flop 114 to the low state, which forces QH 1101 to be turned OFF if it is still ON.

The configurable control loop arrangement 100 may also include DAC slope compensation function 803 and comparator output windowing, similar to the PSFB application example embodiment.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A configurable control loop arrangement for forming a control loop of a DC-DC converter that is configured to generate a control signal to control the DC-DC converter, the configurable control loop arrangement comprising:
 a digital-to-analog converter configured to receive a first-digital-parameter indicative of a difference between an output voltage from a secondary side of the DC-DC converter and a reference voltage, and output an analog converter-output-control-signal based thereon;

a comparator configured to receive the analog converter-output-control-signal at a first terminal and a monitored parameter at a second terminal, the comparator configured to output a comparison signal based on the difference between the converter-output-control-signal and the monitored parameter, wherein the second terminal is configured to be coupled to a primary side of the DC-DC converter to receive the monitored parameter, which is indicative of one of a voltage or current flowing at a component of a primary side of the DC-DC converter;

a timer configured to provide a timing-signal for controlling one or more of: the comparator in the determination of the comparison signal; the application of the comparison signal to a configurable-event-generation-logic-module; and the operation of the configurable-event-generation-logic-module;

wherein the configurable-event-generation-logic-module comprises a flip-flop circuit including a flip-flop cell and mode control circuitry configured to enable the flip-flop cell to operate in a selected mode comprising one of a plurality of modes, said selected mode selected based on a configure-signal received at a terminal of the mode control circuitry, wherein the configurable-event-generation-logic-module, when implemented in the control loop, is configured to provide for generation of the control signal based on the comparison signal, the timing-signal and the selected mode of the flip-flop circuit, and wherein the control signal is for application to one or more switches of the DC-DC converter.

2. The configurable control loop arrangement of claim 1, wherein the second terminal is configure to receive, as the monitored parameter, one of:
   a measure of current in a primary transformer winding of the DC-DC converter; and
   a first capacitor voltage, wherein the primary side of said DC-DC converter includes an LLC arrangement, wherein the LLC arrangement comprises a first inductor and the first capacitor in series with a parallel arrangement of a second inductor and a primary transformer winding of the DC-DC converter.

3. The configurable control loop arrangement of claim 1, wherein the configurable-event-generation-logic-module includes an AND-OR-INVERT module comprising an arrangement of configurable logic gates which can adopt either of at least a first configuration and a second configuration based on an AND-OR-INVERT-control-signal, wherein
   the AND-OR-INVERT module is configured to receive at least the comparison signal and the timing-signal and provide, as an output based on which of the at least first and second configuration is currently adopted, a corresponding first set of values or a different, corresponding second set of values, the first set of values and the second set of values comprising different sets of values which include one or more of the comparison signal, the timing-signal, the comparison signal having a logical operation applied thereto, and the timing-signal having a logical operation applied thereto, and wherein said output is provided to the flip-flop circuit.

4. The configurable control loop arrangement of claim 3, wherein the logical operations include one or more of logic AND, logic NOT and logic OR or combinations thereof applied to at least the comparison signal and the timing-signal.

5. The configurable control loop arrangement of claim 3, including at least a first multiplexer arrangement having a plurality of input terminals and a plurality of output terminals and comprising a plurality of multiplexers, wherein each multiplexer is associated with a respective one of the plurality of output terminals;
   wherein said plurality of multiplexers are each configured to receive a plurality of signals received at the plurality of input terminals, said plurality of multiplexers each individually configurable to direct one of the plurality of signals received thereby to its associated output terminal based on a multiplex-selection-signal;
   wherein said plurality of signals received at the plurality of input terminals includes said comparison signal and said plurality of output terminals are coupled to said AND-OR-INVERT module.

6. The configurable control loop arrangement of claim 5, wherein said plurality of signals received at the plurality of input terminals of the first multiplexer arrangement includes an output of a PWM generator configured to generate a PWM signal based on the control signal.

7. The configurable control loop arrangement of claim 5, wherein said plurality of input signals to the first multiplexer includes said timing-signal and at least one of the plurality of output terminals are coupled to the comparator to enable control of the determination of the comparison signal.

8. The configurable control loop arrangement of claim 1, wherein said mode control circuitry is configured to control signals applied to the flip flop cell and thereby configure the flip-flop cell to operate in said plurality of modes, said plurality of modes comprising modes that comprise the flip-flop cell operating as at least two of:
   a set-reset flip flop;
   a delay flip flop;
   a D latch flip-flop;
   a T flip flop; and
   a JK flip flop.

9. The configurable control loop arrangement of claim 1, wherein the flip flop cell comprises a delay type flip flop having a D-input, a C-input, a Q-output and a Q-complement-output, and the mode control circuitry is configured to provide, in one of the plurality of modes, the Q-complement-output to the D-input and, in a different one of the plurality of modes, provide an input to the flip-flop circuit to the flip-flop cell, said input based on one of the timing-signal or the comparison signal.

10. The configurable control loop arrangement of claim 1 wherein the configurable-event-generation-logic-module comprises a counter, the counter configured to receive a clock signal and the control signal from the configurable-event-generation-logic-module, the counter configurable to measure a time period representing the duration of a state of the control signal and upon elapse of said measured time period from a time point when said state of the control signal changes, provide an input to the flip-flop circuit to provide for control of the control signal.

11. The configurable control loop arrangement of claim 1, wherein the control loop includes a:
   GPIO input configured to receive signalling indicative of a request for synchronization of the control loop, during operation, with an external event or for safety shutdown;
   ADC input configured to receive signalling indicative of a request for an over temperature limit shutdown;
   PWM input configured to receive a PWM signal, the PWM signal comprising pulse width modulated version of the control signal.

12. The configurable control loop arrangement of claim 1, including at least a second multiplexer arrangement having a plurality of input terminals and a plurality of output terminals and comprising a plurality of multiplexers, wherein each multiplexer is associated with a respective one of the plurality of output terminals;
  wherein said plurality of multiplexers are each configured to receive a plurality of signals received at the plurality of input terminals, said plurality of multiplexers each individually configurable to direct one of the plurality of signals received thereby to the associated output terminal based on a second multiplex-selection-signal;
  wherein said plurality of signals received at the plurality of input terminals comprise an output of said flip-flop circuit.

13. The configurable control loop arrangement of claim 12, wherein said plurality of output terminals of the second multiplexer are coupled to a second AND-OR-INVERT module configured for applying logical operations to input signals applied thereto and a pulse width modulation, PWM, generator configured to generate one or more PWM signals based on the signals from the output terminals of the second multiplexer.

14. The configurable control loop arrangement of claim 1, wherein said configurable control loop arrangement includes a pulse width modulation, PWM, generator configured to generate one or more PWM signals based at least on the control signal generated by the flip-flop circuit, said PWM signals comprising a switching pattern for switches of the DC-DC converter.

15. The configurable control loop arrangement of claim 1, wherein said configurable control loop arrangement is configurable as a control loop for at least one of a Phase Shift Full Bridge, PSFB, DC-DC convertor and a Half bridge LLC DC-DC converter.

* * * * *